March 12, 1940.  G. MAIURI  2,193,535

ABSORPTION REFRIGERATING MACHINE

Filed July 8, 1938   2 Sheets-Sheet 1

Inventor:
Guido Maiuri
By: Francis E. Boyce
ATTORNEY

March 12, 1940.  G. MAIURI  2,193,535
ABSORPTION REFRIGERATING MACHINE
Filed July 8, 1938   2 Sheets-Sheet 2
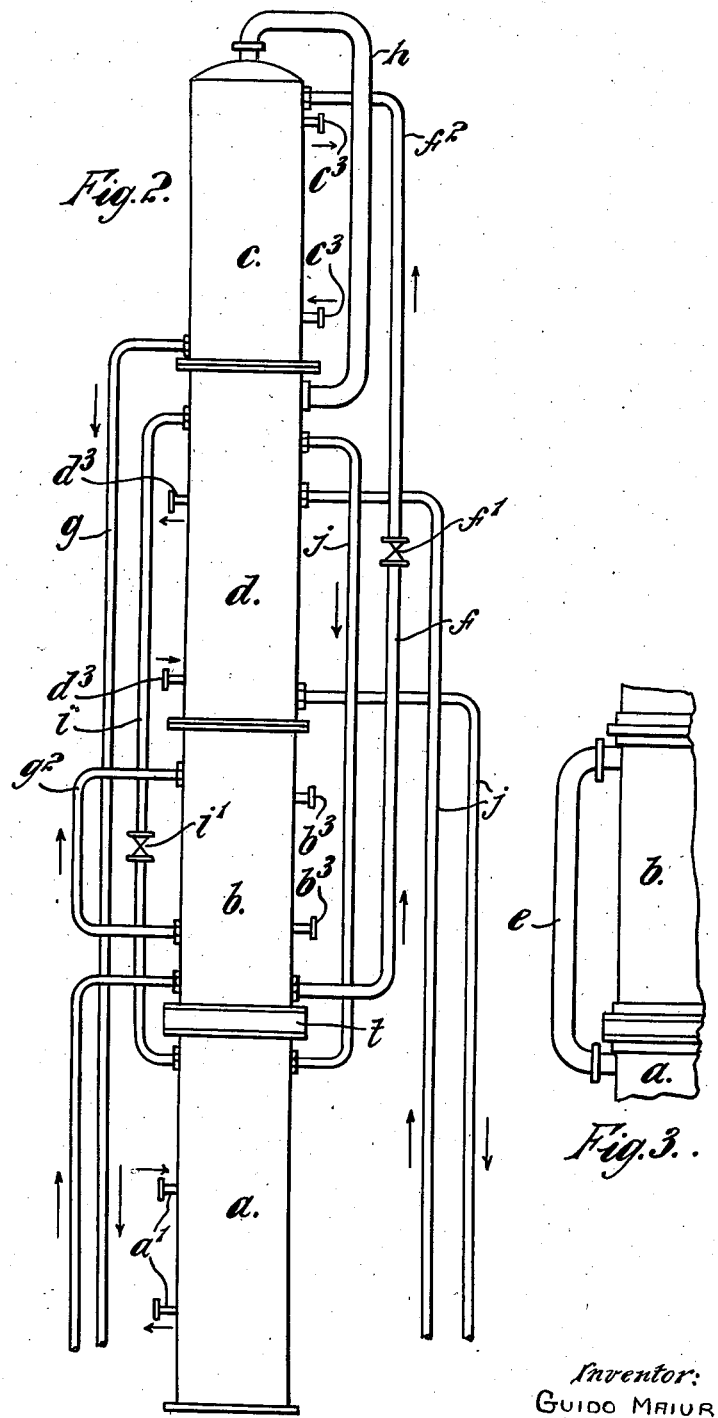
Inventor:
GUIDO MAIURI
BY: Francis E. Boyce
ATTORNEY Patented Mar. 12, 1940

2,193,535

UNITED STATES PATENT OFFICE 2,193,535

ABSORPTION REFRIGERATING MACHINE

Guido Maiuri, Aldwych, London, England, assignor to Maiuri Refrigeration Patents Limited, London, England Application July 8, 1938, Serial No. 218,045

7 Claims. (Cl. 62—119)

This invention relates to absorption refrigerating machines employing liquid absorbents, and including both absorption machines wherein evaporation takes place from a liquefied refrigerant and also reabsorption machines wherein evaporation takes place from strong absorption liquor.

The object of the invention is to improve in absorption refrigerating machines, the mutual exchange of heat between the hot weak liquor proceeding from the generator, and the cooler strong liquor proceeding from the absorber, and the recuperation of latent heat.

To raise towards the generator temperature the temperature of the strong liquor proceeding from the absorber, and to recuperate some of the heat generated by the absorption, in order to increase the efficiency of the machine, the strong liquor traverses a heat-exchanger within the absorber in heat-exchange proximity with the weak liquor admitted into the absorber and also flows in heat-exchange proximity with a heat-exchanger within the generator traversed by weak liquor proceeding from the generator. These heat-exchangers conveniently are pipe coils in the upper portions of the absorber and generator and traversed by the respective liquors. The hot weak liquor thus gives up heat first within the generator to strong liquid admitted into the generator and then on admission to the absorber gives up heat within the absorber to strong liquor proceeding from the absorber to the generator.

These mutual exchanges of heat within the absorber and within the generator cannot completely effect the recuperation of heat by bringing the temperature of the weak liquor down to the temperature of absorption and the temperature of the strong liquor up to the temperature of ebullition, unless they provide for the cooling effect of evaporation of absorbent liquid in the absorber and also for the heating effect of absorption of refrigerant vapour by strong liquor in the generator.

To obtain economical working of the machine the exchange of heat has hitherto been made in contact with vapour in the absorber and generator. Such contact causes condensing, absorbing or evaporating either of the refrigerant or of the absorption liquid and part of the latent heat is utilised in the cycle of the machine, thus increasing its efficiency. However, such heat-exchangers can be efficient only when the vapour phase and the liquid phase in contact are in thermal equilibrium, that is when the composition of the vapour is exactly the same as that produced by evaporation at the existing pressure and temperature from the liquid contacted, otherwise the vapour tends to approach such equilibrium, and a cooling effect instead of the desired heating effect, or vice versa, takes place.

More particularly the object of the present invention is to preclude or diminish the above mentioned effects which detract from recuperation of latent heat between the generator and absorber of an absorption refrigerating machine.

Now the refrigerant vapour which is admitted from the evaporator into the absorber of an absorption refrigerating machine, acts as an inert gas to create therein a partial pressure of the vapour of the absorption liquid, for instance water, of the weak liquor admitted to the absorber. Under this partial pressure, which is lower than the partial pressure of vapour of the absorption liquid in equilibrium with the liquor, evaporation therefore takes place of absorption liquid and thereby absorbs heat to supply the latent heat of such evaporation. This heat is taken from the heat of the weak liquor admitted to the absorber, which weak liquor thus loses heat which otherwise could be imparted by heat-exchange to the strong liquor proceeding to the generator. As a result, the strong liquor is admitted to the generator at a temperature lower than that to which it would have been raised, by heat-exchange with the weak liquor in the absorber and by the latent heat of absorption, but for the abstraction of heat from the weak liquor by the evaporation of absorption liquid. The temperature of the strong liquor therefore cannot solely by the ensuing heat-exchange in the generator be raised to the ebullition temperature of the generator. The strong liquor, moreover, being lower in temperature than the ebullition temperature can absorb refrigerant vapour in the generator, and in so doing develops sensible heat until its temperature rises to the ebullition temperature of a liquor slightly stronger than that entering the generator. This reduces its capacity for abstracting heat from the hot weak liquor traversing the heat-exchanger in the generator.

According to the present invention, in an absorption refrigerating machine, heat-exchange and recuperation of latent heat are effected between and by strong liquor proceeding from the absorber and weak liquor proceeding from the generator, by bringing these liquors into mutual heat-exchange proximity and into thermal proximity with latent heat rendered sensible in the absorber or generator and introducing the liquors directly to vapours substantially in equilibrium with such liquors.

To carry out the invention, heat-exchange between the weak liquor admitted into the absorber from the generator and the strong liquor proceeding from the absorber to the generator, is effected in a stagnant region of the absorber to which refrigerant vapour admitted to the absorber from the evaporator has only indirect access. This can be arranged by admitting the refrigerant vapour from the evaporator to the absorber at the bottom of a bell extending downwards within and to below the heat-exchanger coil traversed by strong liquor in the absorber. The annular space surrounding the bell provides the stagnant region down which the weak liquor flows over the heat-exchanger coil and up which the refrigerant vapour rises to replace that absorbed by the descending liquor.

A vapour mixture in equilibrium with the liquor exposed in the stagnant region of the absorber where the heat-exchanger is located, accumulates there and shields the heat-exchanger from the above mentioned temperature-reducing effect due to absorption liquid evaporating under its partial pressure in freshly admitted refrigerant vapour. The refrigerant vapour in this way enters in a region of the absorber where the vapour in equilibrium with the liquor contains very little vapour of absorption liquid and ascends to a region where the content of vapour of absorption liquid is great, by gradually increasing its content, so being always in thermal equilibrium with the absorbing liquor.

To avoid in the generator the strong liquor absorbing refrigerant vapour and thus becoming raised in temperature and thereby losing some of its capacity for absorbing heat from and cooling the hot weak liquor by heat-exchange in the generator, the strong liquor is shielded in the generator from contact with vapour in the generator, but is kept in heat-exchange proximity with such vapour, until after having effected heat-exchange with the weak liquor proceeding from the generator to the absorber. This can be effected by locating the heat-exchanger coil traversed by the hot weak liquor in an annular space in the boiler maintained by a liquid seal completely occupied by strong liquor admitted into the generator. The strong liquor entering the sealed annular space, in addition to cooling the weak liquor, also cools the vapour adjacent to the annular space, thus contributing to the rectification of said vapour.

Embodiments of the invention are illustrated by way of example on the accompanying drawings, in which:

Fig. 2 is an elevation of a reabsorption machine constructed as a single column, and Fig. 3 is an elevation of a portion thereof on a larger scale.

Figure 1:
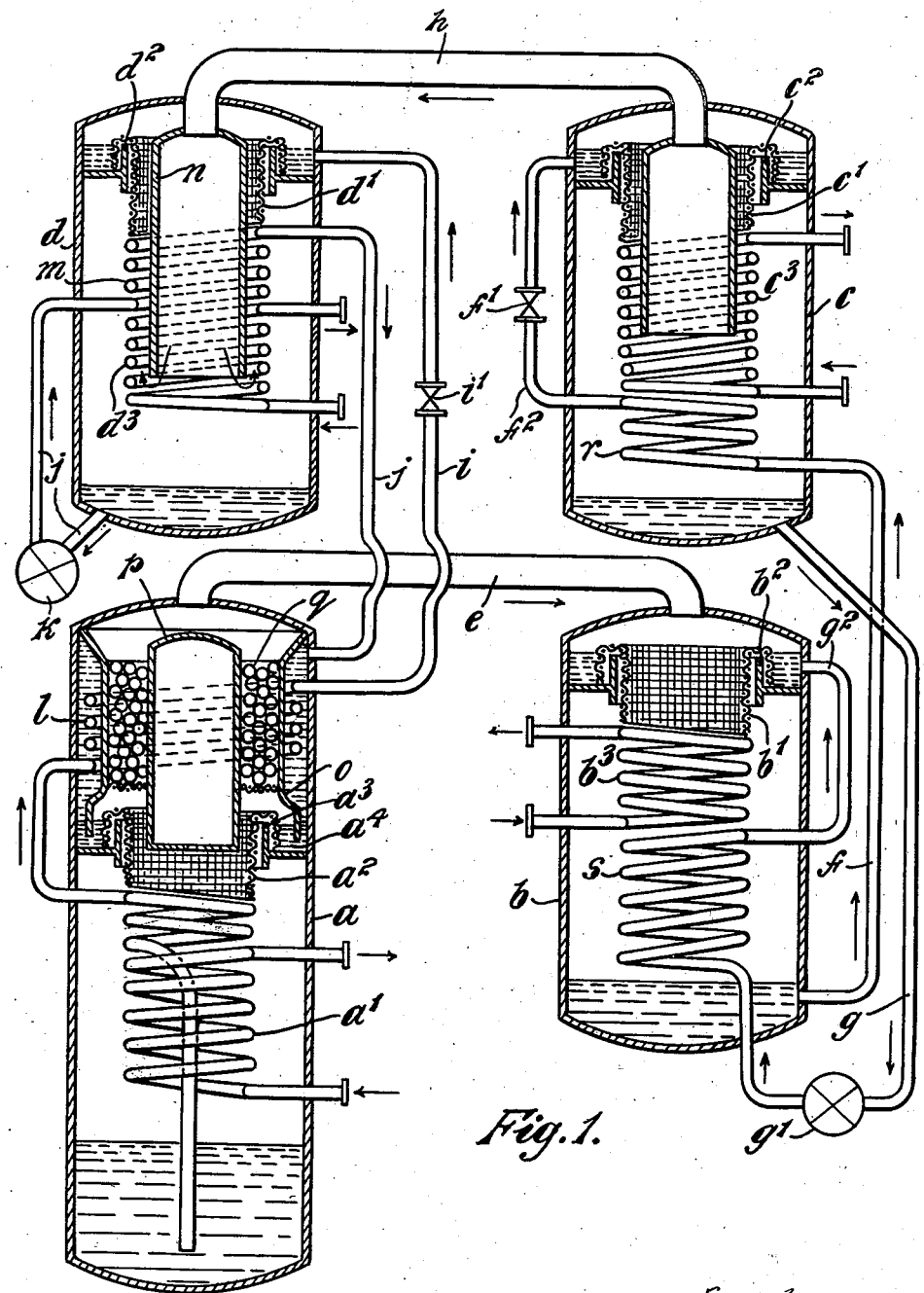
Fig. 1 is a diagrammatic sectional view of a reabsorption refrigerating machine.

Referring more particularly to Fig. 1, the reabsorption machine comprises a generator $a$, a reabsorber $b$, an evaporator $c$ and an absorber $d$. Heat is applied by a steam coil $a^1$ to strong liquor, namely a solution of a refrigerant in an absorption liquid, for instance, a solution of ammonia in water, in the boiler $a$, dripping from a wick $a^2$ straddling a weir $a^3$ on to the steam coil $a^1$ whereby refrigerant vapour is driven off. The refrigerant vapour passes by a pipe $e$ into the reabsorber $b$ wherein it is absorbed in weak liquor descending from a wick $b^1$, straddling a weir $b^2$ and flowing down over a cooling coil $b^3$ traversed by cooling water. The enriched liquor is forced from the reabsorber, by the pressure reigning in the generator and reabsorber, along a pipe $f$, past an expansion valve $f^1$ in a pipe $f^2$, into the evaporator $c$, wherein it descends from a wick $c^1$ straddling a weir $c^2$ and flows down over a coil $c^3$, traversed by brine or other fluid to be refrigerated. Refrigerant evaporates from the strong liquor in the evaporator and thus exerts a refrigerating action on the fluid traversing the pipe coil $c^3$. The impoverished liquor is returned to the reabsorber $b$ by a pipe $g$ in which is connected a pump $g^1$. The vaporised refrigerant passes by a pipe $h$ into the absorber $d$, wherein it is absorbed by weak liquor from the generator $a$ descending from a wick $d^1$ straddling a weir $d^2$ and eventually flows down over a coil $d^3$ traversed by cooling water. The weak liquor is forced from the generator $a$ under the pressure reigning therein along a pipe $i$, in which is an expansion valve $i^1$, into the absorber $d$. The liquor enriched in the absorber $d$ is returned to the generator $a$ by a pipe $j$ in which is connected a pump $k$.

In order to effect an exchange of heat between the hot weak liquor proceeding from the generator $a$ to the absorber $d$, and the cooler strong liquor proceeding from the absorber $d$ to the generator $a$, the hot weak liquor traverses a pipe coil $l$ in the generator $a$ and connected to the above mentioned pipe $i$ leading to the absorber $d$, and the cooler strong liquor traverses a pipe coil $m$ in the absorber $d$ and connected in the above mentioned pipe $j$ leading to the generator $a$.

The pipe coil $m$ is located in the absorber $d$ immediately beneath the wick $d^1$ so that the arriving weak liquor drips thereon and flows down thereover and gives up heat to the strong liquor traversing this coil $m$. The pipe coil $l$ is located in the generator $a$ so as to be contacted by and give up to the incoming strong liquor heat from the weak liquor traversing this coil $l$. Thus within the absorber the outgoing strong liquor receives heat from the already admitted weak liquor and from the latent heat of absorption, and within the generator the outgoing weak liquor gives up heat to the already admitted strong liquor.

If in the absorber $d$, refrigerant vapour arriving from the evaporator $c$ by the pipe $h$ is allowed to come into immediate contact with the weak liquor arriving by the pipe $i$ and dripping from the wick $d^1$, the refrigerant vapour, for instance ammonia, being almost free from absorption medium, for instance water, would cause evaporation of some of the absorption medium. Any such evaporation would absorb heat and thus reduce the heating effect exerted by the admitted weak liquor on the coil $m$. To avoid this the refrigerant vapour is admitted to the absorber by a bell $n$ extending downwards within and to below the bottom end of the coil $m$. In the annular space surrounding the bell $n$ where the coil $m$ is located, a stagnant atmosphere of refrigerant vapour saturated with vaporised absorption liquid accumulates from which refrigerant vapour is absorbed by the weak liquor and which is replenished with refrigerant vapour rising from the bottom of the bell $n$.

If in the generator $a$ the strong liquor arriving by the pipe $j$ is exposed to the vapour in the generator before it has exerted a cooling effect on the coil $l$, its cooling capacity would be decreased owing to becoming heated by absorption of refrigerant vapour. To avoid this, the incoming strong liquor comes into contact with the coil $l$ in an annular space formed by an annular partition $o$ dipping into the liquid seal formed by the trough $a^4$ around the weir $a^3$. This annular space is thus fully occupied by liquor to which vapour has no access.

The central portion of the generator $a$ within the annular partition $o$ is occupied by a hollow core $p$, having a small hole at the bottom to equalise external and internal pressures. This core $p$ restricts the passage of the ascending vapour to the annular space between it and the annular partition $o$, which space is occupied by Raschig rings $q$ to promote rectification of the vapour.

Recuperation of heat is also effected by heat-exchange between the warmer strong liquor proceeding from the reabsorber $b$ to the evaporator $c$, and the impoverished liquor proceeding from the evaporator $c$ to the reabsorber $b$. For this purpose, a pipe coil $r$, interconnecting the pipes $f$ and $f^2$, is provided in the evaporator $c$ beneath the above mentioned pipe coil $c^3$ traversed by the fluid to be refrigerated. The strong liquor from the reabsorber $b$ traverses this coil $r$ and thereby is cooled by the vaporised refrigerant in the evaporator $c$, before being admitted by the pipe $f^2$ into the top of the evaporator $c$. Also the impoverished liquor returning to the reabsorber $b$ by the pipe $g$ and pump $g^1$, traverses a pipe coil $s$, connected to the pipe $g$ and provided in the reabsorber $b$ beneath the cooling coil $b^3$, before being admitted into the top of the reabsorber $b$, by a pipe $g^2$ connected to this coil $s$.

Figs. 2 and 3 show the reabsorption refrigerating machine constructed as a single column built of superposed cylindrical vessels, divided from one another by transverse partitions. The bottom vessel is the generator $a$. Next above the generator $a$, with a layer of heat-insulating material $t$ interposed, is the reabsorber $b$. Directly on the reabsorber $b$ is the absorber $d$, and on top of the absorber $d$ is the evaporator $c$. The pipes and other parts corresponding to those described in connection with Fig. 1 are denoted by the same reference characters and numerals. There is no pipe coil $r$ in this evaporator $c$ and the pipe connections $f$ $f^2$ therefore lead direct to the top thereof.

This arrangement as a single column of the various vessels constituting the reabsorption machine leads to economy in construction, and lessens the chance of leakage to the exterior.

The construction shown in the drawings is given only as an example, and the invention can be performed in various entirely different types of construction. For instance, the heat-exchanger between weak and strong liquor inside the generator can be used in an ordinary refrigerating machine and can be included in the upper part of the generator used for rectification of the vapour, with or without additional water cooling.

The reabsorption refrigerating machine is particularly suitable for cooling liquids, as for instance creosote in a process for the recovery of benzole, and water or brine for air conditioning. A characteristic of a reabsorption machine is that evaporation of refrigerant takes place at progressively higher temperatures as the liquor in the evaporator becomes progressively impoverished. The liquid to be cooled, such as creosote, can therefore be cooled with a substantially constant temperature difference between it and the refrigerant, by being led through the pipe coil $c^3$ in contra-flow with the liquor descending over this coil and becoming progressively impoverished. The creosote is therefore admitted to the bottom end of the coil $c^3$ and leaves at the upper end.

The pressure in the evaporator $c$ is, for instance, atmospheric and evaporation takes place from a 50% ammonia liquor admitted at the top giving there an evaporation temperature of $-6°$ C. The temperature of evaporation rises with the progressive impoverishment of the liquor to, for instance, a 40% ammonia liquor giving an evaporation temperature of $+10°$ C. This range of temperature is for instance used to cool creosote, in a process for the extraction of benzole from coke oven gas, from $+15°$ C. to $0°$ C. by contra-flow heat-exchange in the pipe coil $c^3$, or to cool water in air conditioning plants, from $+15°$ C. to $+1°$ C.

The absorption refrigerating machine can be arranged as an absorption refrigerating machine wherein evaporation takes place by diffusion of refrigerant vapour into an inert gas, in which case a return flow pipe for the inert gas is provided between the absorber and the evaporator. If in such machine the inert gas is present in such quantity as to equalise the pressure in the generator and reabsorber and the total pressure in the evaporator and absorber, the expansion valves can be omitted.

I claim:—

1. In an absorption refrigerating machine, a generator, a refrigerant receiver connected to said generator, an evaporator connected to said refrigerant receiver, an absorber, a conduit supplying strong liquor from said absorber to said generator, a pipe coil in the upper portion of said absorber and connected in said strong liquor conduit, means delivering weak liquor from said generator on to said pipe coil in said absorber, means delivering refrigerant vapour from said evaporator into said absorber beneath said pipe coil, and means shielding said pipe coil from direct access thereto of said refrigerant vapour.

2. In an absorption refrigerating machine, a generator, a refrigerant receiver connected to said generator, an evaporator connected to said refrigerant receiver, an absorber, a conduit supplying strong liquor from said absorber to said generator, a pipe coil in the upper portion of said absorber and connected in said strong liquor conduit, means delivering weak liquor from said generator on to said pipe coil in said absorber, and a bell extending downwards within and to below said pipe coil and connected to said evaporator.

3. In an absorption refrigerating machine, a generator, a refrigerant receiver connected to said generator, an evaporator connected to said refrigerant receiver, an absorber, a conduit supplying weak liquor from said generator to said absorber, a pipe coil in said generator and connected in said weak liquor conduit, a trough in said generator, a partition in said generator closing a space containing said pipe coil and dipping into said trough, and means delivering strong liquor from said absorber into said space containing said pipe coil.

4. In an absorption refrigerating machine, a generator, a refrigerant receiver connected to said generator, an evaporator connected to said refrigerant receiver, an absorber, a conduit supplying weak liquor from said generator to said absorber, a pipe coil in the upper portion of said generator and connected in said weak liquor conduit, a trough in said generator, an annular partition in said generator on the inner side of and closing an annular space containing said pipe coil and dipping into said trough, and means delivering strong liquor from said absorber into said annular space containing said pipe coil.

5. In an absorption refrigerating machine, a generator, a refrigerant receiver connected to said generator, an absorber, a pipe coil in the upper portion of said absorber, means delivering refrigerant vapour from said evaporator into said absorber beneath said pipe coil, a pipe coil in said generator, a trough in said generator, a partition in said generator closing a space containing said pipe coil in said generator and dipping into said trough, a conduit including said pipe coil in said generator and delivering weak liquor from said generator on to said pipe coil in said absorber, and a conduit including said pipe coil in said absorber and delivering strong liquor from said absorber into said space containing said pipe coil in said generator.

6. In an absorption refrigerating machine, a generator, a refrigerant receiver connected to said generator, an evaporator connected to said refrigerant receiver, an absorber, a pipe coil in the upper portion of said absorber, a bell extending downwards within and to below said pipe coil in said absorber and connected to said evaporator, a pipe coil in the upper portion of said generator, a trough in said generator, an annular partition in said generator on the inner side of and closing an annular space containing said pipe coil in said generator and dipping into said trough, a conduit including said pipe coil in said generator and delivering weak liquor from said generator on to said pipe coil in said absorber, and a conduit including said pipe coil in said absorber and delivering strong liquor from said absorber into said space containing said pipe coil in said generator.

7. A method of effecting heat-exchange and recuperation of latent heat of absorption in an absorber of an absorption refrigerating machine between and by weak liquor admitted into said absorber from the generator of said machine and strong liquor proceeding from said absorber to said generator, consisting in introducing said weak liquor directly into a stagnant region in said absorber, introducing refrigerant vapour from the evaporator of said machine into said absorber outside said stagnant region, and in said stagnant region bringing said liquors into mutual heat-exchange proximity and into thermal proximity with latent heat of absorption rendered sensible in said absorber.

GUIDO MAIURI.